US008623219B2

(12) United States Patent
Geiger (10) Patent No.: US 8,623,219 B2
(45) Date of Patent: Jan. 7, 2014

(54) FLUID PURIFICATION LEVEL CONTROL APPARATUSES AND METHODS

(75) Inventor: Kenneth L. Geiger, Sebring, FL (US)

(73) Assignee: Next Generation Filtration Systems, LP, Pittsburgh, PA (US)

( * ) Notice: Subject to any disclaimer, the term of this patent is extended or adjusted under 35 U.S.C. 154(b) by 466 days.

(21) Appl. No.: 12/497,588

(22) Filed: Jul. 3, 2009

(65) Prior Publication Data

US 2011/0000859 A1   Jan. 6, 2011

(51) Int. Cl.
*B01D 36/00* (2006.01)
*B01D 24/48* (2006.01)
*B01D 1/30* (2006.01)

(52) U.S. Cl.
USPC ............. 210/744; 210/86; 210/180; 210/182; 210/183; 123/196 A; 196/46.1

(58) Field of Classification Search
USPC ........ 123/196 A; 196/46.1; 210/86, 180, 182, 210/183, 744
See application file for complete search history.

(56) References Cited

U.S. PATENT DOCUMENTS

| 1,930,006 | A | 10/1933 | Fox |
| 2,078,818 | A | 4/1937 | Troxell |
| 2,331,482 | A | 10/1943 | Lamb |
| 2,446,126 | A | 6/1948 | Crake |
| 2,472,717 | A | 6/1949 | Morey |
| 2,713,422 | A | 7/1955 | James |
| 2,765,259 | A | 10/1956 | Schwalge |
| 2,785,109 | A | 3/1957 | Schwalge |
| 3,575,264 | A | 4/1971 | Johnson et al. |
| 3,674,650 | A | 7/1972 | Fine |
| 4,184,808 | A | 1/1980 | Cobb |
| 4,272,371 | A | 6/1981 | Moses et al. |
| 4,354,946 | A | 10/1982 | Warlick et al. |
| 4,437,968 | A | 3/1984 | Elliott, Jr. |
| 4,677,929 | A | 7/1987 | Harris |
| 4,753,724 | A | 6/1988 | Womble |
| 4,830,745 | A | 5/1989 | van der Meulen |
| 5,198,104 | A | 3/1993 | Menyhert |
| 5,322,596 | A | 6/1994 | Arntz |
| 5,795,462 | A | 8/1998 | Shurtleff |
| 5,843,284 | A | 12/1998 | Waters et al. |

(Continued)

FOREIGN PATENT DOCUMENTS

| EP | 0155442 A2 | 9/1985 |
| WO | 8202497 A1 | 8/1982 |

(Continued)

OTHER PUBLICATIONS

Oil Purification Systems, Inc. Installation Instructions, Edition 1.0 (Jul. 2006) http://www.oilpursys.com/files/GENERIC%20INSTALLATION%2001-03-2007.pdf (accessed Nov. 28, 2007).

(Continued)

*Primary Examiner* — Nam Nguyen
*Assistant Examiner* — Paul J Durand
(74) *Attorney, Agent, or Firm* — Richard W. James (57) ABSTRACT

Apparatuses and methods for level control in a fluid purification apparatus. The apparatuses and methods include a fluid purification apparatus and a level sensor that regulates operation of the fluid purification apparatus. The level sensor may further operate a bypass valve or a heater.

18 Claims, 5 Drawing Sheets

(56) References Cited

U.S. PATENT DOCUMENTS

| | | |
|---|---|---|
| 5,882,486 A | 3/1999 | Moore, Jr. |
| RE36,527 E | 1/2000 | Arntz |
| 6,083,406 A | 7/2000 | De Paul et al. |
| 6,139,725 A | 10/2000 | Barr |
| 6,287,455 B1 | 9/2001 | Whitmore |
| 6,493,508 B1 * | 12/2002 | Roesgen ............... 392/485 |
| 6,955,754 B2 | 10/2005 | de Sylva |
| 7,396,473 B1 | 7/2008 | Guynn |
| 2004/0140271 A1 | 7/2004 | Whitmore et al. |
| 2008/0197064 A1 * | 8/2008 | Blasco Remacha et al. . 210/184 |
| 2009/0139917 A1 | 6/2009 | Geiger |
| 2009/0139936 A1 | 6/2009 | Geiger |
| 2010/0025341 A1 | 2/2010 | Priest et al. |

FOREIGN PATENT DOCUMENTS

| | | | |
|---|---|---|---|
| WO | WO 88/05917 A1 | 8/1988 | |
| WO | 2006032270 A1 | 3/2006 | |
| WO | WO 2009032285 A1 * | 3/2009 | ............. B01D 39/00 |

OTHER PUBLICATIONS

Brochure for PREMO-PLUS filtration system Premo Lubrication Technologies, Inc.

* cited by examiner

FLUID PURIFICATION LEVEL CONTROL APPARATUSES AND METHODS

CROSS-REFERENCE TO RELATED APPLICATIONS

None.

FIELD OF THE INVENTION

The present invention is directed to operation of a fluid purification system, including operational control systems and methods, safety systems and methods, temperature control systems and methods, power control systems and methods, fluid pumping systems and methods, and air filtration and fluid removal systems and methods. In particular, the fluid purification operational systems and methods are directed to systems and methods that control and provide safe operation of a fluid purification system in various environments.

BACKGROUND OF THE INVENTION

Fluid purification apparatuses, systems and methods with which the present fluid purification operational apparatuses, systems and methods may be used are disclosed in U.S. patent application Ser. Nos. 11/948,210 and 11/948,256. It is believed that certain of those fluid purification apparatuses, systems and methods would benefit from improved operational and control systems and methods.

Fluid purification apparatuses, systems and methods sometimes operate in extreme conditions or under varying circumstances. For example, certain fluid purification apparatuses and systems operate in vehicles and are subject to extreme cold temperatures. Thus, it is believed that there is a need for apparatuses, systems and methods of maintaining fluid purification operation in cold temperatures.

Other fluid purification apparatuses and systems operate in vehicles that would be better served by fluid purification apparatuses and systems that include circuitry for safe operation. Thus, it is believed that there is a need for devices, systems and methods that provide for safe operation of fluid purification apparatuses in various applications.

Pressure restricting devices are sometimes used in fluid purification apparatuses and systems. For example, in fluid purification apparatuses that separate and remove water from the fluid, pressure is frequently reduced to introduce the fluid into an evaporator chamber through which air is circulated. Such pressure restricting devices may reduce pressure at the outlet of the fluid purification apparatus to an undesirable extent. Thus, it is believed that there is a need for apparatuses, systems and methods of pumping fluid from a fluid purification apparatus and for applying energy acquired from a pressurized fluid entering a fluid purification apparatus to fluid leaving the fluid purification apparatus.

Fluid purification apparatuses, systems and methods also sometimes operate in systems using fluid storage tanks, such as hydraulic fluid tanks, and those fluid storage tanks are sometimes vented to the atmosphere. Accordingly, it is believed that there is a need for improved devices, systems and methods for treating atmospheric gases entering or leaving such a fluid storage tank.

SUMMARY OF THE INVENTION

The present invention is directed to systems, methods and apparatuses for purifying fluids. In accordance with one embodiment of the present fluid purification invention, there is provided a fluid purification apparatus, having a filter chamber, an evaporator chamber, a bypass valve, and a level sensor. The evaporation chamber is positioned adjacent the filter chamber, and has a cavity to receive fluid. The bypass valve has a first port coupled to one of the fluid purification apparatus filter chamber and the evaporator chamber, a second port for coupling to a fluid inlet line to the fluid purification apparatus, and a third port for coupling to a fluid outlet line from the fluid purification apparatus. The level sensor is disposed in the evaporator chamber cavity and coupled to actuate the bypass valve so as to position the bypass valve to prevent fluid flow through the evaporator chamber when the level of fluid in the evaporator chamber is not appropriate for operation of the evaporator chamber and to position the bypass valve for flow through the evaporator chamber when the level of fluid in the evaporator chamber is appropriate for operation of the evaporator chamber.

In another embodiment, a fluid purification apparatus includes a filter chamber, an evaporator chamber positioned adjacent the filter chamber, the evaporator chamber having a cavity to receive fluid, a pre-heater disposed on one of the filter chamber, the evaporator chamber, and a fluid inlet line conducting fluid to the fluid purification apparatus, and a level sensor disposed in the evaporator chamber cavity and coupled to energize the pre-heater when the level of fluid in the evaporator chamber is not appropriate for operation of the evaporator chamber and de-energize the pre-heater when the level of fluid in the evaporator chamber is appropriate for operation of the evaporator chamber.

In yet another embodiment, a method of preventing an evaporator chamber of a fluid purification apparatus from flooding with fluid is provided. The method includes sensing a level of a fluid in the evaporator chamber and actuating at least one of a pre-heater and a bypass valve if the level of the fluid in the evaporator chamber is above a desired level.

The present filtration apparatuses and methods provide advantages that may include improved fluid flow from a pressure reducing filtration apparatus in a pressurized fluid system.

Accordingly, the present invention provides solutions to the shortcomings of prior filtration apparatuses, systems, and methods. Those of ordinary skill in fluid purification will readily appreciate that those details described above and other details, features, and advantages of the present invention will become further apparent in the following detailed description of the preferred embodiments of the invention.

BRIEF DESCRIPTION OF THE DRAWINGS

The accompanying drawings, which are incorporated herein and constitute part of this specification, include one or more embodiments of the invention, and together with a general description given above and a detailed description given below, serve to disclose principles of the invention in accordance with a best mode contemplated for carrying out the invention.

DETAILED DESCRIPTION OF THE INVENTION

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for purposes of clarity, other elements found in typical systems with which fluid filtration apparatuses, systems, and methods are employed.

Any reference in the specification to "one embodiment" or "an embodiment" means that a particular feature, structure or characteristic described in connection with the embodiment is included in at least one embodiment of the invention. The appearances of phrases such as "in one embodiment" in various places in the specification are not necessarily all referring to the same embodiment. References to "or" are furthermore intended as inclusive so "or" may indicate one or another of the ored terms or more than one ored term.

Figure 1:
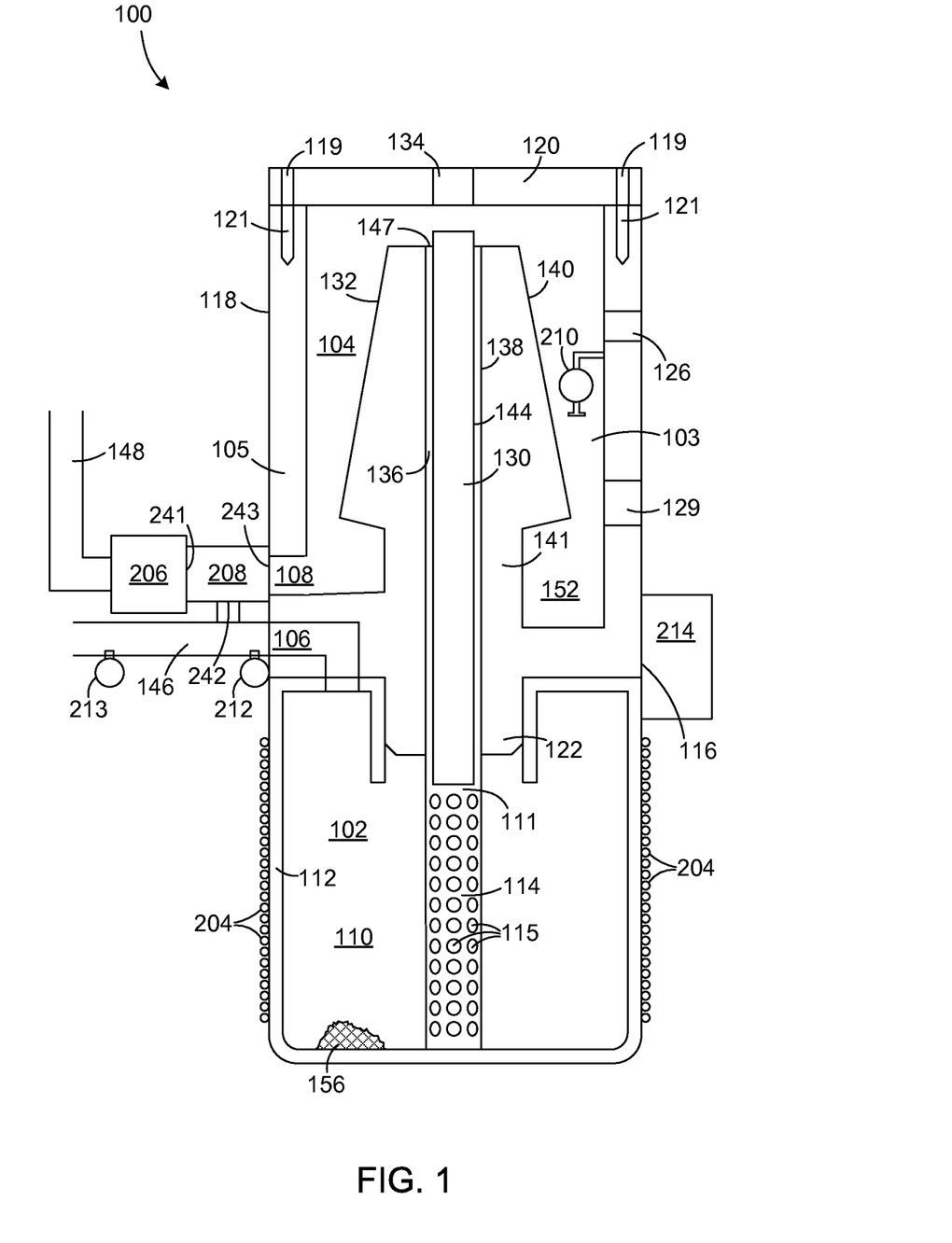
FIG. 1 is a cross-sectional view of an embodiment of a fluid purification apparatus.

FIG. 1 illustrates a cross-sectional view of an embodiment of a fluid purification apparatus 100. The fluid purification apparatus 100 includes a filter chamber 102, an evaporator chamber 104, and a filter base 105.

The filter chamber 102 includes a filter cavity 110 and a filter canister 112. A filter or filter media 156 may be placed in the filter cavity, for example, by unscrewing the filter canister 112 from the base 105, placing the filter media 156 in the filter canister 112, and screwing the filter canister 112 back in place on the base 105. The filter chamber 102 of FIG. 1 further includes a perforated tube 114, having perforations 115. The perforated tube 114 is situated to pass through a central cylindrical opening in the filter media 156, such that fluid may flow into the filter chamber 102, through the filter media 156, into the perforated tube 114 and pass from the perforated tube 114 into the evaporator chamber 104 through an inner-chamber opening 111. In one embodiment, the filter chamber 102 is a particulate filter chamber and functions to remove particulates from the fluid.

The evaporator chamber 104 includes a heater wiring inlet 134, a heater 130, an evaporation tube 132, an evaporator gas inlet 129, and an evaporator gas outlet 126. A level sensor 210, such as a float switch or other level sensor, and a temperature sensor 214, such as a high temperature switch or other temperature sensor, may be disposed in a cavity 103 of the evaporator chamber 104 or positioned near the evaporator chamber 104.

In the embodiment illustrated in FIG. 1, the evaporation tube 132 is fitted around the heater 130 and fluid passes from the filter chamber 102 into the evaporator chamber 104 through a fluid heating channel 136 formed between the heater 130 and an inner surface 138 of the evaporation tube 132. The heated fluid flows out from the evaporator end 147 of the evaporation tube 132 after it passes through the fluid heating channel 136. The heated fluid then passes over an outer surface 140 of the evaporation tube 132 and into the evaporation chamber 104 where certain volatiles of the heated fluid, such as water and uncombusted fuel, turn to a gas and are vented from the evaporator chamber 104 through the evaporator gas outlet 126.

The evaporation tube 132 may be in contact with the divider 116 and may furthermore be attached to the divider 116 or formed with the divider 116. The evaporation tube 132 may also be shaped with a conically shaped outer surface 140 that is pinched 141 near where the evaporation tube 132 meets the divider 116. Fluid passing out of the fluid heating channel 136 may flow along the outer surface 140 of the evaporation tube 132 into a fluid reservoir 152 in the evaporator chamber 104.

The base 105 includes the divider 116 that at least partially separates the filter chamber 102 from the evaporator chamber 104. The base 105 may also include a circular wall 118 that extends from the divider 116 to at least partially enclose the evaporator chamber 104. An evaporator chamber cap 120 may be attached to the base 105 to cover and provide access to the evaporator chamber 104. The evaporator chamber cap 120 may be attached to the base 105 as desired and may, for example, be attached by way of screws extending through holes 119 in the evaporator chamber cap 120 and threaded into threaded holes 121 formed in the circular wall 118.

A threaded circular portion 122 may also extend from the divider 116 portion of the base 105, opposite the circular wall 118, for attachment of the filter canister 112.

In the embodiment illustrated in FIG. 1, a high temperature switch 214 is located on the base 105 of the fluid purification apparatus 100. The high temperature switch 214 may alternately be located in the evaporator chamber 104 or elsewhere so as to sense the temperature of the fluid in the evaporator chamber 104 or the temperature in the vicinity of the evaporator chamber 104. The high temperature switch 214 may be wired directly to the heater 130 power to de-energize the heater 130 when the temperature sensed by the high temperature switch 214 rises above the set point of the high temperature switch 214. Alternately, any type of temperature sensor coupled to a controller or relay to control operation of the heater 130 may comprise or be included with the high temperature switch 214.

Also in the embodiment illustrated in FIG. 1, a pre-heater 204 is wrapped around the base 105 or the filter canister 112 to warm the fluid in cold conditions. The pre-heater 204 may alternately or in addition be located so as to warm fluid prior to the fluid entering the fluid purification apparatus 100.

The fluid purification apparatus 100 of FIG. 1 includes an inlet 106 leading to the filter chamber 102 and an outlet 108 leading from the evaporator chamber 104. A pump 206, a bypass valve 208, and a pressure sensor 212 are shown adjacent to the fluid purification apparatus 100 near the inlet 106 and outlet 108. One or more of those components 206, 208, and 212 may alternately be incorporated into the fluid purification apparatus 100 or installed in a fluid inlet line 146 or an fluid outlet line 148.

The fluid purification apparatus 100 may be used in various applications including filtration of lubricants in engines of various types and in pressurized fluid applications such as hydraulic fluid system. Oil, hydraulic fluid, or another fluid may pass through the filter chamber 102 and the evaporator chamber 104 in series and in either order or may pass through the filter chamber 102 or the evaporator chamber 104 individually or in parallel.

Figure 2:
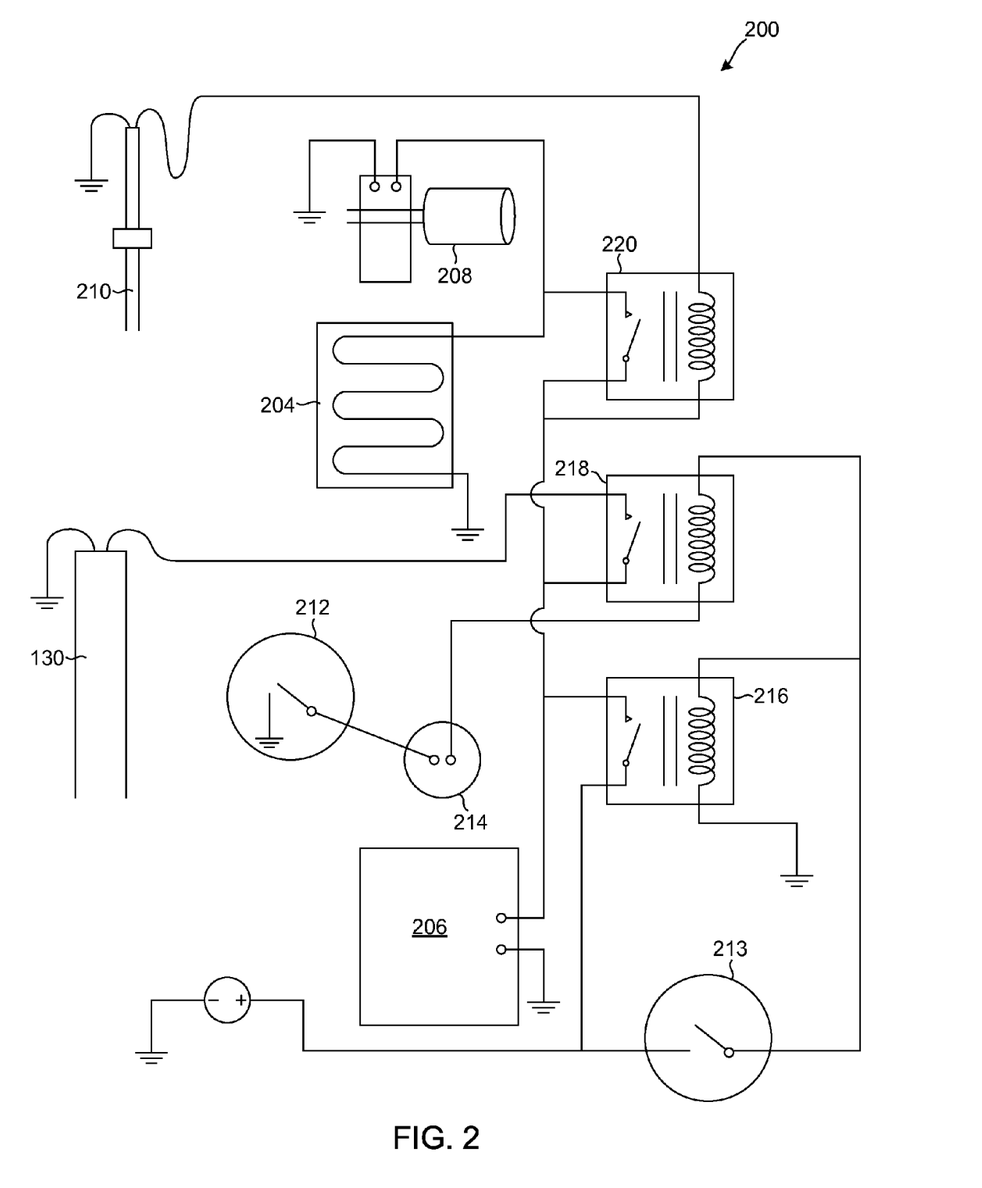
FIG. 2 is a schematic view of an embodiment of a safety and control system for a fluid purification apparatus.

FIG. 2 illustrates a control circuit 200 for an embodiment of a fluid purification apparatus control system. The control circuit 200 shows the evaporator chamber heater 130, the pre-heater 204, the pump 206, and the bypass valve 208 controlled by the level sensor 210, the pressure sensor 212, the temperature switch 214, a pump relay 216, an evaporator relay 218, and a filter heater relay 220.

In the embodiment of FIG. 2, power is provided to the control circuit 200 when the system to which the fluid purification apparatus 100 is coupled is in operation. For example, if the fluid purification system is coupled to a vehicle started by a key, power that is energized when the key is turned to the on position may also power the control circuit 200. Alternately, the control circuit 200 may be energized by power from a desired circuit of the system to which the fluid purification apparatus 100 is coupled or through a sensor, such as a system pressure sensor 213, which may be a pressure switch or sensor/controller arrangement that indicates the fluid is under pressure and, from that, the system using the fluid is in operation.

Where the control circuit 200 is energized by a system pressure sensor 213, that system pressure sensor 213 may be located anywhere pressure is applied to the fluid under normal system operation, such as for example, in a fluid line near a system fluid pump (not shown) or near the inlet 106 of the fluid purification apparatus 100.

In one embodiment, a fluid purification apparatus or system includes a fluid purification apparatus, such as the fluid purification apparatus 100 illustrated in FIG. 1, and an electrical circuit, such as the control circuit 200 of FIG. 2. In such an embodiment, it may be desirable to energize the control circuit 200 only when a system served by the fluid purification apparatus 100 is in operation. For example, when the fluid purification apparatus 100 is operating on oil in an engine, it may be desirable to operate the fluid purification apparatus 100 only when the engine is running. Alternately, when the fluid purification apparatus 100 is serving a hydraulic fluid system, it may be desirable to operate the fluid purification apparatus 100 only when the hydraulic fluid system is operating. To accomplish fluid purification apparatus 100 operation only when the system served by the fluid purification apparatus 100 is operating, system power that is on only when the system served by the fluid purification apparatus 100 is operating may be used to power the fluid purification apparatus 100. Alternately, a sensor that senses operation of the system served by the fluid purification apparatus 100 may be used to energize the fluid purification apparatus 100 through its control circuit 200.

In an embodiment, the system pressure sensor 213 is used to sense operation of the system served by the fluid purification apparatus 100 and energize and de-energize the fluid purification apparatus 100 through its control circuit 200. The system pressure sensor 213 in the embodiment illustrated in FIG. 1 is disposed to sense pressure of fluid adjacent the inlet 106 of the fluid purification apparatus 100 and is coupled, by wiring for example, to de-energize the control circuit 200 when pressure of the fluid is below a desired level and to energize the control circuit 200 when pressure of the fluid is above the desired level. The system pressure sensor 213 may have a switch to control operation of the control circuit 200 or may be of the sensor controller type and may operate one or more relays, such as relays 216, 218, and 220 where appropriate. The system pressure sensor 213 may furthermore operate using hysteresis and may have a fixed or adjustable set point.

In the embodiment of FIG. 2, the heater 130 warms fluid in an evaporator chamber of a fluid purification apparatus, such as the evaporator chamber 104 of the fluid purification apparatus 100 illustrated in FIG. 1. The heater 130 warms the fluid so as to cause volatiles such as water in the fluid to evaporate so that, once separated, the volatiles may be removed from the fluid. If overheating occurs, however, the fluid may be damaged or degraded. Therefore, the temperature switch 214 is incorporated into the control system circuit 200 of FIG. 2 to de-energize the heater 130 if the temperature in the evaporator chamber 104 exceeds the set point of the temperature switch 214.

In an embodiment, a bi-metal temperature controller, such as a thermostatic temperature controller, is used as the temperature switch 214 to de-energize the heater 130 if the fluid becomes too warm. The temperature controller type temperature switch 214 may have a temperature sensitive element, such as the bi-metal element, placed near the heated fluid and may have a contact that controls operation of the heater 130 directly or through a relay such as the evaporator relay 218 shown in FIG. 2. In an embodiment where the temperature switch 214 includes an electrical contact rated for the voltage and current powering the heater 130, the contact may be actuated by the temperature sensitive element dependent on the temperature of the element and wired in series with the heater 130. In an embodiment, the temperature switch 214 includes a set point adjustment to adjust the temperature at which the contact opens and closes. In another embodiment, the temperature controller type temperature switch 214 has a fixed set point at which the contact opens and closes.

The temperature switch 214 may operate using hysteresis such that the temperature switch 214 contact opens at one temperature and closes at a lower temperature. For example, in an embodiment, the temperature switch 214 contact opens when the temperature exceeds 980 Celsius and closes when the temperature drops back below 950 Celsius.

The element of the temperature switch 214 may be placed in direct contact with the fluid, for example in the evaporator chamber 104. Alternately, the element of the temperature switch 214 may be placed proximate to the fluid, such as by use of a well (not shown), or by gluing or otherwise securing the temperature switch 214 adjacent the fluid purification apparatus 100 in a position that is indicative of the temperature of the fluid. The element may furthermore be incorporated into the temperature switch 214 or may be attached thereto rigidly or flexibly.

It may be desirable, in some embodiments, to have fluid flowing through a fluid purification system, such as the fluid purification apparatus 100 of FIG. 1, when an evaporator heater, such as the heater 130 of FIG. 1, is energized. An indication that fluid is flowing through the fluid purification apparatus 100 may be sensed in various ways, including use of a flow sensor or switch in fluid communication with the fluid flowing through the fluid purification system. alternately, a pressure sensor or switch in fluid communication with the fluid flowing through the fluid purification system may be used to indicate fluid is flowing through the fluid purification apparatus 100. In the embodiment illustrated in FIG. 2, a pressure sensor 212, which may be a pressure switch or another device, is used to sense fluid flow through the fluid purification apparatus 100. The pressure sensor 212 may be located at the inlet 106 of the fluid purification apparatus 100, at the outlet 108 of the fluid purification apparatus 100, inside the fluid purification apparatus 100, or otherwise in fluid communication with fluid flowing through the fluid purification apparatus 100. The pressure sensor 212 may be set such that a contact in the pressure sensor 212 is open when fluid pressure is below a set point, which may be a desired level, and the contact is closed when fluid pressure is above the set point. In that way, the heater 130 is de-energized when the pressure sensor 212 contact is open, and the heater 130 is energized when the pressure sensor 212 contact is closed.

Either pressure sensor 212 or 213 may operate using hysteresis such that the pressure sensor 212 or 213 contact opens at one pressure and closes at a slightly different pressure. For example, in an embodiment, the contact of one of the pressure sensors 212 or 213 closes when the pressure exceeds 5 psi and opens when the pressure drops back below 4.5 psi.

In an embodiment illustrated in FIGS. 1 and 2, the pressure sensor 212 or other pressure sensor controller arrangement is disposed in fluid communication with fluid flowing through the filter chamber 102 and the evaporator chamber 104. The pressure sensor 212 is in that fluid communication such that the pressure sensor senses the pressure of the fluid at some location within or adjacent to the filter chamber 102 or evaporator chamber 104, such as in the inlet 106 of the fluid purification apparatus 100. For example, in an embodiment as seen in FIG. 1, the pressure sensor 212 senses pressure in the inlet 106 of the fluid purification apparatus 100, where the fluid flows from the inlet 106, through the filter chamber 102, through the evaporator chamber 104, and out of the fluid purification apparatus 100 at the outlet 108. That pressure sensor 212 is wired to the heater 130 through the filter heater relay 220 to energize the heater 130 when the fluid pressure at the inlet 106 is above a desired level and de-energize the heater 130 when the fluid pressure at the inlet is below the desired level. It may be noted that other devices, which may be referred to as safety devices, such as the temperature switch 214, may be wired with the pressure sensor 212 to prevent operation of the heater 130 when operating conditions are not appropriate for operation of the heater 130. Such operating conditions may include low flow or high temperature conditions, and/or other undesirable operating conditions.

In one embodiment, the pressure sensor is further wired to de-energize all electrical components of the fluid purification apparatus. The pressure sensor may de-energize all the electrical components when fluid is not fluid is not flowing through the fluid purification apparatus 100.

As may be seen in the embodiment of FIG. 2, the pressure sensor 212 and temperature switch 214 may be wired in series to energize the evaporator relay 218 when unit operational power is applied, the pressure is above the set point of the pressure sensor 212, and the temperature is lower than the set point of the temperature switch 214. When the evaporator relay 218 is energized, a contact on the evaporator relay 218 is closed and the heater 130 is energized. Thus, the heater 130 in this embodiment is energized when the unit is powered on, the temperature in or near the evaporator chamber 104 is below a temperature whereby the fluid may be damaged or degraded, and fluid is flowing through the fluid purification apparatus 100.

The level sensor 210, such as a float switch or other level sensor/controller, may be situated in the evaporator chamber 104, as illustrated in FIG. 1. The level sensor 210 may be actuated to permit fluid flow into the evaporator chamber 104 when fluid level in the evaporator chamber 104 is appropriate for operation. For example, in an embodiment, when the fluid level is at or below a high level limit, the level sensor 210 may be actuated to permit fluid flow through the evaporator chamber 104. Alternately, the level sensor may actuate the bypass valve 208 when the fluid level in the evaporator chamber is not appropriate for operation of the evaporator chamber 104. For example, in an embodiment, it may not be appropriate to operate the evaporator chamber 104 when the fluid level in the evaporator chamber 104 rises above the high level limit of the level sensor 210 and, thus, the level sensor 210 may actuate the bypass valve 208 to bypass fluid flow around the evaporator chamber 104.

In an embodiment of a large scale hydraulic fluid application, the level sensor 210 may permit flow into the evaporator chamber 104 when the fluid level in the evaporator chamber 104 is not more than half full and stop fluid flow into the evaporator chamber 104 when the fluid level in the evaporator chamber 104 is more than half full.

It has been discovered that when the fluid temperature is particularly low, for example, when hydraulic fluid is less than 25° Celsius, the fluid tends not to flow out of the evaporator chamber 104 well and, therefore, to accumulate in the evaporator chamber 104. In the embodiment shown in FIG. 2, actuation of the level sensor 210 when the fluid level is below the high limit level closes an electrical contact associated with the level sensor 210, thereby energizing the filter heater relay 220 using power supplied only when the system using the fluid is in operation. The filter heater relay 220, in turn, controls operation of the pre-heater 204 and the bypass valve 208.

The pre-heater 204 may be used to warm fluid being purified before the fluid enters the evaporator chamber 104. In the embodiments shown in FIGS. 1 and 2, the pre-heater 204 includes a wrappable heating element such as a flexible heat tape type heater for wrapping around an object. Such a flexible heat tape type heater may be wrapped around the filter canister 112, the inlet line leading to the filter chamber 102, or elsewhere as desired. Alternately, another type of heater may be provided to warm the fluid before it enters the evaporator chamber 104.

When the fluid level in the evaporator chamber rises above the level that actuates the level sensor 210, the pre-heater 204 is energized to warm fluid in the filter chamber 102. It should be noted that the pre-heater 204 may alternately be placed on the evaporation chamber 104, the fluid inlet line 146, or elsewhere to heat the fluid at any desired location.

An embodiment of the fluid purification apparatus 100 includes a filter chamber 102 and an evaporator chamber 104 positioned adjacent the filter chamber 102. The evaporator chamber 104 further includes a cavity 103 to receive fluid in which the level sensor 210 is disposed. The pre-heater 204 is disposed on the filter chamber 102, the evaporator chamber 104, or the fluid inlet line 146 conducting fluid to the fluid purification apparatus 100. The level sensor 210 is disposed in the evaporator chamber cavity 103 and coupled to energize the pre-heater 204 when the level of fluid in the evaporator chamber 104 is not appropriate for operation of the evaporator chamber 104 and de-energize the pre-heater 204 when the level of fluid in the evaporator chamber 104 is appropriate for operation of the evaporator chamber 104. In one embodiment, the fluid level in the evaporator chamber 104 is appropriate for operation of the evaporator chamber 104, and the level sensor 210 will therefore energize the pre-heater 204, when the fluid level is above a predetermined level.

The bypass valve 208 may be located in the fluid outlet line 148 as shown in FIG. 1 or in the fluid inlet line 146 as desired. The bypass valve 208 may have three ports, a common port 241, a normally open port 242, and a normally closed port 243. The bypass valve 208 may furthermore be normally open to the fluid purification apparatus 100 in its de-energized state or normally open to the fluid inlet line 146 in its de-energized state, as desired for failsafe operation or another reason.

The bypass valve 208 depicted in FIGS. 1 and 2 is open to the fluid inlet line 146 when de-energized so that fluid flows from the fluid inlet line 146 to the fluid outlet line 148 directly. The bypass valve 208 depicted in FIGS. 1 and 2 is open to the fluid purification apparatus 100 when energized so that fluid flows from the fluid inlet line 146 through the fluid purification apparatus 100 and then to the fluid outlet line 148. The bypass valve 208 is energized by the filter heater relay 220 when the fluid system being served by the fluid purification apparatus 100 is operating and when the level sensor 210 senses a fluid level in the evaporator chamber 104 below the high limit level.

Other bypass arrangements are also possible, including a bypass valve 208 that receives fluid from the filter chamber 102 and bypasses the evaporator chamber 104, directing fluid from the filter chamber 102 directly into the system, rather than from the filter chamber 102 into the evaporator chamber 104 and then into the system. In the embodiment illustrated in FIG. 2, the fluid is furthermore pumped into the system by the pump 206 regardless of whether the fluid passes through the bypass valve 208, although embodiments where the pump 206 is de-energized and the bypass valve 208 bypasses the pump 206 as well are also contemplated.

In an embodiment, a fluid purification apparatus 100 includes a bypass valve 208 having a first port 243 coupled to one of the filter chamber 102 and the evaporator chamber 104, a second port 242 for coupling to the fluid inlet line 146, and a third port 241 for coupling to a fluid outlet line 148. That fluid purification apparatus 100 also includes a level sensor 210 disposed in the evaporator chamber 104 cavity 103 and coupled to actuate the bypass valve 208 so as to position the bypass valve 208 to prevent fluid flow through the evaporator chamber 104 when the level of fluid in the evaporator chamber 104 is not appropriate for operation of the evaporator chamber 104 and to position the bypass valve 208 for flow through the evaporator chamber 104 when the level of fluid in the evaporator chamber 104 is appropriate for operation of the evaporator chamber 104.

The bypass valve 208 may be actuated electrically, pneumatically, or as desired. The bypass valve 208 may be a solenoid type valve that moves to two distinct positions or may be modulated to permit fluid flow to be mixed from two different sources or diverted to two different destinations.

The ports of the bypass valve 208 may be arranged as desired. For example, in one embodiment, the first port 243 of the bypass valve 208 is the common port and is coupled to the fluid inlet line 146 of the fluid purification apparatus 100. In another embodiment, the first port 243 of the bypass valve 208 is the common port and is coupled to the fluid outlet line 148 of the fluid purification apparatus 100.

The bypass valve 208 may bypass fluid flow so that there is no fluid flowing through either the evaporator chamber 104 or the filter chamber 102 of the fluid purification apparatus 100 when the fluid level in the evaporator chamber 104 is not appropriate for operation of the evaporator chamber 104. The bypass valve 208 may further conduct fluid flow from the fluid inlet line 146 to the fluid outlet line 148 when the fluid level in the evaporator chamber 104 is not appropriate for operation of the evaporator chamber 104. Conversely, the bypass valve 208 may conduct fluid flow from the fluid inlet line 146, through both chambers 102 and 104 of the fluid purification apparatus 100 and then to the fluid outlet line 148 when the fluid level in the evaporator chamber 104 is appropriate for operation of the evaporator chamber 104.

In embodiments, the bypass valve 208 conducts fluid flow from the filter chamber 102 to the fluid outlet line 148 when the fluid level in the evaporator chamber 104 is not appropriate for operation of the evaporator chamber 104. In embodiments, the bypass valve 208 conducts fluid flow from the filter chamber 102 through the evaporator chamber 104 and then to the fluid outlet line 148 when the fluid level in the evaporator chamber 104 is appropriate for operation of the evaporator chamber 104.

A method of preventing an evaporator chamber from flooding with fluid is also contemplated. An embodiment of the method includes sensing a level of a fluid in the evaporator chamber 104 and actuating at least one of a pre-heater 204 and a bypass valve 208 if the level of the fluid in the evaporator chamber 104 is above a desired level.

A method of controlling the pressure of fluid in a fluid purification apparatus 100 is also contemplated. An embodiment of the method includes sensing the pressure of the fluid, such as with the pressure sensor 212, de-energizing the heater 130 disposed in the filter chamber 102 of the fluid purification apparatus 100 when the pressure of the fluid is below a desired level and energizing the heater 130 when the pressure of the fluid is above the desired level. In embodiments of that method, the pressure of the fluid may be sensed in the filter chamber 102 or in the inlet 106, which is in fluid communication with the filter chamber 102. The method may further include de-energizing one or more electrical components of the fluid purification apparatus 100, such as all the electrical components, when no fluid is flowing through the fluid purification apparatus 100. The method may further include increasing the temperature of the fluid in the evaporator chamber 104 of the fluid purification apparatus 100 when the temperature of the fluid in the evaporator chamber 104 is lower than a set point and possibly also when the pressure of the fluid in the filter chamber 102 is above the desired pressure level.

The pump 206 may be a fluid return pump in one embodiment as illustrated in FIGS. 1 and 2, and may be used to pressurize the fluid leaving the fluid purification apparatus 100. The pump 206 is energized in the control circuit 200 of FIG. 2 when the fluid system is energized to maintain flow in the fluid system.

In certain filtration apparatuses, pressurizing fluid leaving the filtration apparatus may be unnecessary. For example, where the fluid purification apparatus 100 is situated above the system into which the fluid is being discharged, the fluid may flow from the fluid purification apparatus 100 into the fluid system by way of gravity feed. In other embodiments, however, it may be desirable to increase fluid pressure leaving the fluid purification apparatus 100 when, for example, fluid flow through the fluid purification apparatus 100 is restricted.

In the embodiment illustrated in FIG. 1, a pump 206 is used to propel fluid from the fluid purification apparatus 100. The pump 206 may, for example, be an electrically powered centrifugal impeller pump. In certain embodiments, an intake pump (not shown) may be used to impel fluid into the fluid purification apparatus 100. The intake pump may also be electrically powered centrifugal impeller pump, for example, or may be a pulse pump or other desired type of pump.

FIG. 2 illustrates an embodiment in which the pump 206 is energized when the system power is turned on. In certain embodiments, such as the one shown in FIG. 2, a relay, such as the pump relay 216, may be used to provide power to the pump 206.

Figure 3:
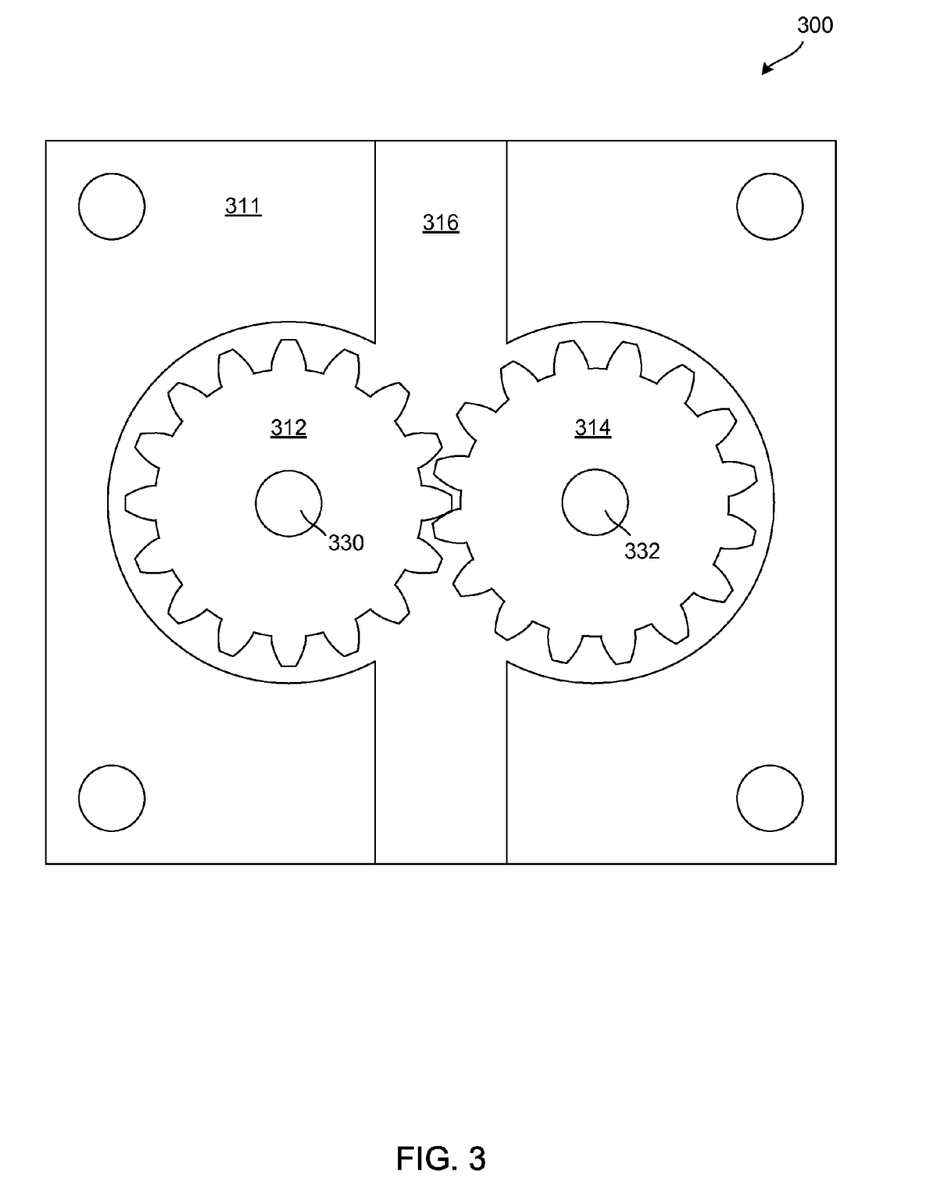
FIG. 3 is a top cross-sectional view of a pressure driven pump.
Figure 4:
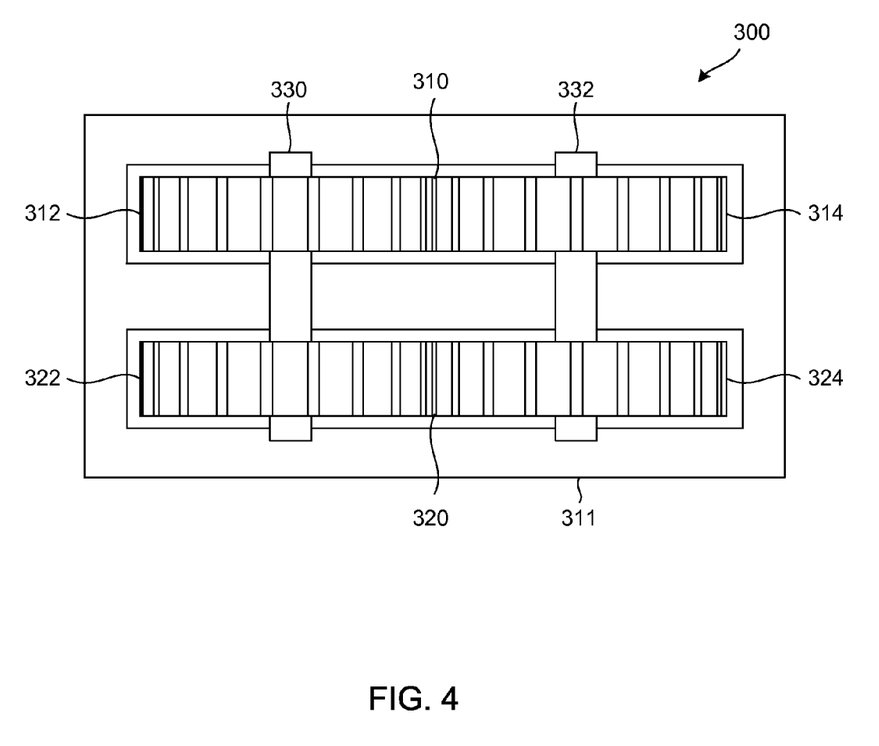
FIG. 4 is a side cross-sectional view of the pressure driven pump of FIG. 3.

FIG. 3 illustrates a top cross-sectional view of an embodiment of a fluid driven pump 300 and FIG. 4 illustrates a side cross-sectional view of the fluid driven pump 300 of FIG. 3. The fluid driven pump 300 may be mounted such that fluid entering the fluid purification apparatus 100 at or near the inlet 106 is propelled through a fluid driven rotating inlet device 310 and fluid leaving the fluid purification apparatus 100 is propelled by an outlet impeller 320 coupled to the fluid driven rotating inlet device 310.

The fluid driven pump 300 of FIGS. 3 and 4 is provided to pressurize fluid leaving the fluid purification apparatus 100 using pressure from the fluid entering the fluid purification apparatus 100. The fluid driven pump 300 includes a fluid driven rotating inlet device 310 in fluid communication with the inlet 106 of the fluid purification apparatus 100 and an outlet impeller 320 in fluid communication with the outlet 108 of the fluid purification apparatus 100. The outlet impeller 320 is driven by the fluid driven rotating inlet device 310 such that the pressure of the fluid entering the fluid purification apparatus 100 is applied to fluid leaving the fluid purification apparatus 100, thereby pumping the fluid out of the fluid purification apparatus 100.

The fluid driven pump 300 of FIGS. 3 and 4 includes a housing 311, the fluid driven rotating inlet device 310 which may include a pair of intermeshing inlet gears 312 and 314, and the output impeller 320 which may include a pair of intermeshing outlet gears 322 and 324. The pair of intermeshing inlet gears 312 and 314 are situated in fluid communication with the inlet 106 of the fluid purification apparatus 100 and the pair of intermeshing outlet gears 322 and 324 are situated in fluid communication with the outlet 108 of the fluid purification apparatus 100. The outlet gears 322 and 324 are driven by the inlet gears 312 and 314, thereby using the pressure of the fluid entering the fluid purification apparatus 100 to pump the fluid out of the fluid purification apparatus 100.

In that embodiment, pressurized fluid entering the fluid purification apparatus 100 is directed through an inlet channel 316 in which teeth of the first inlet gear 312 and the second inlet gear 314 are meshed. Thus, the inlet gears 312 and 314 are driven or rotated by the pressure of the pressurized fluid entering the fluid purification apparatus 100.

The first outlet gear 322 may be situated on a common shaft 330 with the first inlet gear 312 and the second outlet gear 324 may be situated on a common shaft 332 with the second inlet gear 314. In that way, the outlet gears 322 and 324 are driven by the inlet gears 312 and 314. The inlet 106 may furthermore be axially aligned with the outlet 108 to permit the inlet gears 312 and 314 to be stacked on the outlet gears 322 and 324 for ease of coupling of the gears by common shafts 330 and 332. Because the outlet gears 322 and 324 are located at the outlet 108 of the fluid purification apparatus 100, the outlet gears 322 and 324, in turn, pump fluid out of the fluid purification apparatus 100.

The first outlet gear 322 may be coupled to the first inlet gear 312 or the second outlet gear 324 may be coupled to the second inlet gear 314 by a mechanical connection other than the common shaft 330 or 332 where the common shaft 330 or 332 is undesirable.

Alternate embodiments where an inlet gear is driven by pressurized fluid entering the fluid purification apparatus 100 and where the inlet gear drives an outlet gear or impeller to pressurize fluid leaving the fluid purification apparatus 100 are further contemplated. For example, in an embodiment, a single gear may be driven by the pressurized fluid or a single gear or impeller may be driven by the inlet gear.

Figure 5:
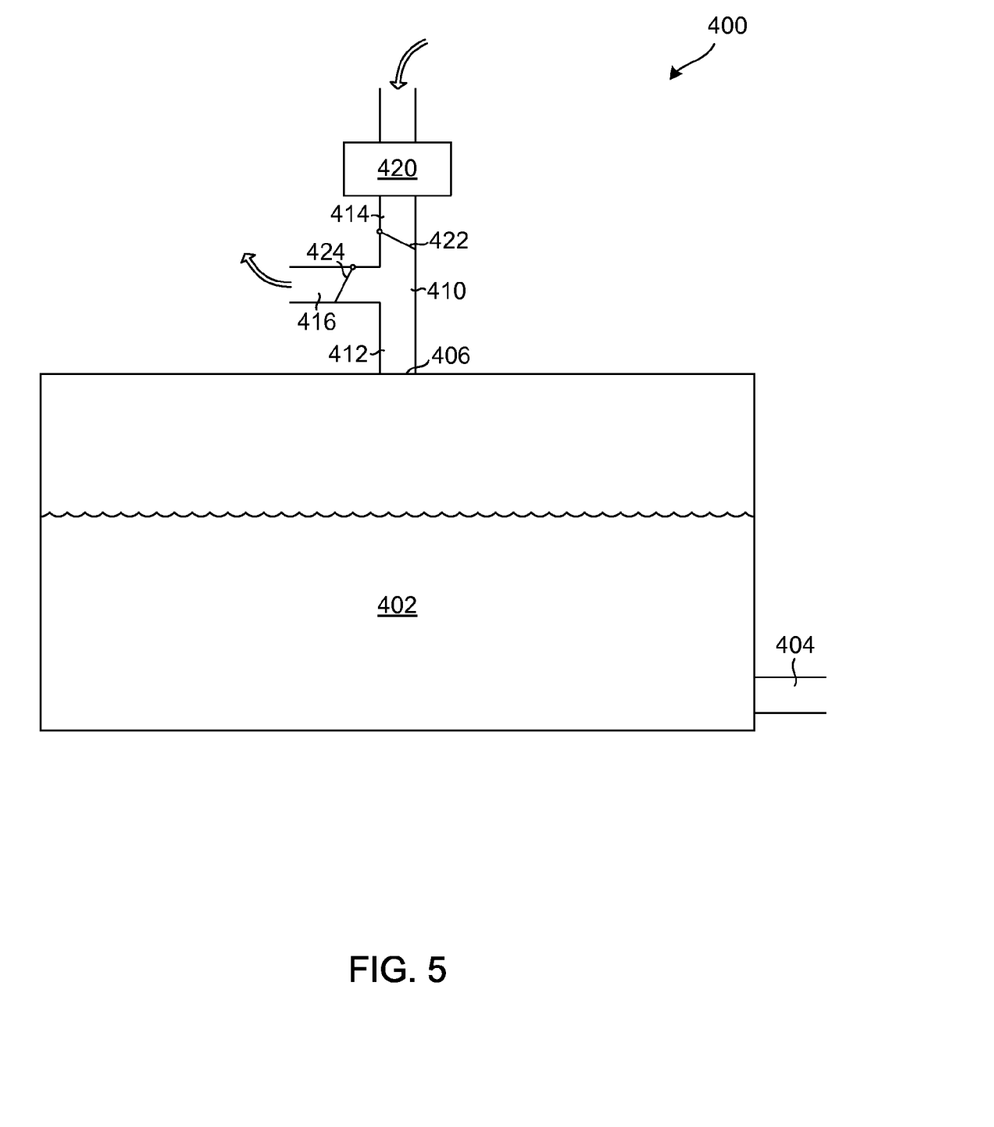
FIG. 5 is a side cross-sectional view of a hydraulic tank that includes an air filtration device.

FIG. 5 illustrates an embodiment of a hydraulic tank arrangement 400 for use in connection with the fluid purification apparatus 100 illustrated in FIG. 1. Hydraulic systems frequently incorporate a hydraulic tank 402 to hold excess hydraulic fluid not currently in use in the hydraulic system 404. Typically, hydraulic fluid is drawn from the hydraulic tank 402 by a hydraulic system 404 when the hydraulic system 404 requires additional fluid and excess hydraulic fluid is returned to the hydraulic tank 402 when not in use in the hydraulic system 404. The hydraulic tank 402 includes a breather 406 to permit air to enter the hydraulic tank 402 to fill space left empty when hydraulic fluid is removed from the hydraulic tank 402 and to permit air to escape from the hydraulic tank 402 when it is displaced by hydraulic fluid returning to the hydraulic tank 402. It is believed, however, that air carries undesirable particles and materials into the hydraulic tank 402 each time air enters the hydraulic tank 402. Accordingly, a filter is provided at the breather 406 of the hydraulic tank 402 of FIG. 5.

In the embodiment depicted in FIG. 5, the filter is a desiccant type filter 420 that dries air entering the hydraulic tank 402 by removing water from that air. Any of the various types of desiccant filters known may be used in this application, including multiple cartridge desiccant dryers and self-drying desiccant filters. It has been discovered that hydraulic fluid damages certain types of commercially available desiccant material and it is recognized that only the air entering the hydraulic tank 402 need be dried to protect the hydraulic fluid in the hydraulic tank 402. Therefore, a system of check valves has been devised to direct air leaving the hydraulic tank 402 directly to the atmosphere and to direct air entering the hydraulic tank through the desiccant filter 420.

The check valve system includes a tee 410 with a first branch 412 coupled to the breather 406 of the hydraulic tank 402, a second branch 414 coupled to a desiccant filter 420, and a third branch 416 venting to the atmosphere. A first check valve 422 is coupled between the second branch 414 of the tee 410 and the desiccant filter 420 such that the first check valve 422 permits air flow from the desiccant filter 420 to the hydraulic tank 402. A second check valve 424 is coupled to the third branch 416 of the tee 410 such that the second check valve 424 permits air flow from the hydraulic tank 402 to the atmosphere. In that way, air is drawn into the hydraulic tank 402 through the desiccant filter 420, thereby drying air entering the hydraulic tank 402, and air is discharged from the hydraulic tank 402 directly to the atmosphere, thereby preventing air discharged from the hydraulic tank 402 from contacting the desiccant filter 420.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments. Thus, while certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

What is claimed is:

1. A fluid purification apparatus, comprising:
   an inlet;
   a filter chamber in fluid communication with the inlet;
   an evaporator chamber positioned adjacent the filter chamber, the evaporator chamber having a cavity to receive fluid;
   a bypass valve having a first port coupled to the inlet, a second port for coupling to a fluid inlet line, and a third port for coupling to a fluid outlet line; and
   a level sensor disposed in the evaporator chamber cavity and coupled to actuate the bypass valve so as to position the bypass valve to prevent fluid flow through the evaporator chamber and the filter chamber when the level of fluid in the evaporator chamber is not appropriate for operation of the evaporator chamber and to position the bypass valve for flow through the evaporator chamber and the filter chamber when the level of fluid in the evaporator chamber is appropriate for operation of the evaporator chamber.

2. The fluid purification apparatus of claim 1, wherein the bypass valve is a solenoid type valve.

3. The fluid purification apparatus of claim 1, wherein the bypass valve bypasses fluid flow so that there is no fluid flowing through the evaporator chamber and there is no fluid flowing through the filter chamber when the fluid level in the evaporator chamber is not appropriate for operation of the evaporator chamber.

4. The fluid purification apparatus of claim 3, wherein the bypass valve conducts fluid flow from the fluid inlet line to the fluid outlet line when the fluid level in the evaporator chamber is not appropriate for operation of the evaporator chamber.

5. The fluid purification apparatus of claim 1, wherein the bypass valve conducts fluid flow from the fluid inlet line through the filter chamber and the evaporator chamber and then to the fluid outlet line when the fluid level in the evaporator chamber is appropriate for operation of the evaporator chamber.

6. The fluid purification apparatus of claim 1, wherein the bypass valve conducts fluid flow from the filter chamber to the fluid outlet line when the fluid level in the evaporator chamber is not appropriate for operation of the evaporator chamber.

7. The fluid purification apparatus of claim 1, wherein the bypass valve conducts fluid flow from the filter chamber through the evaporator chamber and then to the fluid outlet line when the fluid level in the evaporator chamber is appropriate for operation of the evaporator chamber.

8. The fluid purification apparatus of claim 1, wherein the filter chamber is enclosed by a filter canister around which is wrapped a pre-heater, and wherein the level sensor further energizes the pre-heater when the fluid level in the evaporator chamber is not appropriate for operation of the evaporator chamber.

9. The fluid purification apparatus of claim 1, wherein the level of fluid in the evaporator chamber is appropriate for operation of the evaporation chamber when the fluid level is below a high level limit.

10. The fluid purification apparatus of claim 1, wherein the level of fluid in the evaporator chamber is not appropriate for operation of the evaporation chamber when the fluid level is above a high level limit.

11. A fluid purification apparatus, comprising:
 a filter chamber;
 an evaporator chamber positioned adjacent the filter chamber, the evaporator chamber having a cavity to receive fluid consisting of one of oil and hydraulic fluid;
 a pre-heater disposed on one of the filter chamber, the evaporator chamber, and a fluid inlet line conducting fluid to the fluid purification apparatus; and
 a level sensor disposed in the evaporator chamber cavity and coupled to energize the pre-heater when the level of fluid in the evaporator chamber is not appropriate for operation of the evaporator chamber and de-energize the pre-heater when the level of fluid in the evaporator chamber is appropriate for operation of the evaporator chamber.

12. The fluid purification apparatus of claim 11, wherein the pre-heater is a flexible heat tape type heater for wrapping around an object.

13. The fluid purification apparatus of claim 11, wherein the pre-heater is energized when the fluid level in the evaporator chamber is above a predetermined level.

14. A method of preventing an evaporator chamber of a fluid purification apparatus from flooding with fluid, the method comprising:
 sensing a level of a fluid consisting of one of oil and hydraulic fluid in the evaporator chamber; and
 actuating a pre-heater wrapped around a filter canister through which the fluid flows to the evaporator chamber if the level of the fluid in the evaporator chamber is above a desired level.

15. The method of claim 14, further comprising actuating the pre-heater and a bypass valve if the level of the fluid in the evaporator chamber is above a desired level.

16. The method of claim 15, wherein the bypass valve conducts flow through the evaporator chamber when the sensed level of the fluid is below the desired level.

17. The method of claim 15, wherein the bypass valve prevents flow through the evaporator chamber when the sensed level of the fluid is above the desired level.

18. The method of claim 14, wherein the pre-heater heats the fluid before it enters the evaporator chamber.

* * * * *